United States Patent [19]

Matsuda et al.

[11] Patent Number: 5,331,819
[45] Date of Patent: Jul. 26, 1994

[54] SUPERCONDUCTING ROTATING APPARATUS

[75] Inventors: Takeshi Matsuda; Kenichi Suzuki; Toshiyuki Aiba, all of Yokohama, Japan

[73] Assignee: Kabushiki Kaisha Toshiba, Kawasaki, Japan

[21] Appl. No.: 770,474

[22] Filed: Oct. 3, 1991

[30] Foreign Application Priority Data

Oct. 5, 1990 [JP] Japan ................................ 2-266289

[51] Int. Cl.$^5$ ...................... H02K 55/04; H02K 9/00; F17C 7/02
[52] U.S. Cl. .................................. 62/51.1; 62/505; 310/52; 310/90.5; 505/888
[58] Field of Search .................... 62/51.1, 505; 310/52, 310/90.5; 505/878, 885, 888, 898

[56] References Cited

U.S. PATENT DOCUMENTS

| 3,280,353 | 10/1966 | Hayden et al. | |
|---|---|---|---|
| 4,079,273 | 3/1978 | Lambrecht et al. | 62/505 X |
| 4,164,126 | 8/1979 | Laskavis et al. | 62/505 X |
| 4,178,777 | 12/1979 | Ying et al. | |
| 4,352,033 | 9/1982 | Antonov et al. | 310/52 |
| 4,365,479 | 12/1982 | Weghaupt et al. | 505/888 X |
| 4,642,495 | 2/1987 | Mori et al. | 310/52 |
| 4,808,869 | 2/1989 | Kopp | 310/78 |
| 4,908,347 | 3/1990 | Denk | 310/52 K |
| 4,914,328 | 4/1990 | Hooper et al. | |
| 5,030,863 | 7/1991 | Yoshimura et al. | 310/52 |
| 5,093,754 | 3/1992 | Kawashima | 310/90.5 X |

FOREIGN PATENT DOCUMENTS

| 2107535 | 8/1971 | Fed. Rep. of Germany . | |
| 2253302 | 6/1975 | France . | |
| 0079465 | 5/1983 | Japan | 310/52 |
| 1563217 | 3/1980 | United Kingdom . | |
| 2165592 | 4/1986 | United Kingdom | 310/90.5 |

OTHER PUBLICATIONS

Swiss Periodical, Technishche Rundschau, No. 48, 8 pages, 1980, Dr. Diemar Weinmann, "Racomastandardkupplungen".
IEEE Trans Mag, vol. 23, No.5, Sep. 1987, pp. 3536–3538, N. Maki, et al., "Test Results Of 50 MVA Superconducting Generator".
IEEE Trans PAS, vol PAS 104, No. 6, Jun. 1985, pp. 1484–1491, J. A. Fealey, et al., "Comprehensive Test and Evaluation of a 20 MVA Superconducting Generator".
Patent Abstracts of Japan, vol. 13, No. 433(E-824){3781}, Sep. 27, 1989, & JP-A-1-160356, Jun. 23, 1989, M. Nagao, "Superconducting Rotor".
Patent Abstracts of Japan, vol. 14, No. 371(E-963), Aug. 10, 1990, & JP-A-2-133056, May 22, 1990, H. Kinoshita, "Brushless Optical Motor".
Patent Abstracts of Japan, vol. 13, No. 198 (E-756){3546}, May 11, 1989, & JP-A-1-19962, Jan. 24, 1989, K. Ozawa, "Synchronous Machine".
Patent Abstracts of Japan, vol. 13, No. 381(E-810){3729}, Aug. 23, 1989, & JP-A-1-129766, May 23, 1989, H. Nakayama, et al., "Superconducting Rotor".
Patent Abstracts of Japan. vol. 8, No. 155(E-256){1592}, Jul. 19, 1984, & JP-A-59-59042, Apr. 4, 1984, T. Ootaka, "Superconductive Rotary Electric Machine".
Dietrich Lambrecht, Panel Discussion on the Impact of Superconducting Technologies on Future Power Systems and Equipment, Cigre SC11 Meeting Sep. 1, 1990, Fed. Republic of Germany.

*Primary Examiner*—Henry A. Bennett
*Assistant Examiner*—C. Kilner
*Attorney, Agent, or Firm*—Oblon, Spivak, McClelland, Maier & Neustadt

[57] ABSTRACT

A superconducting rotating apparatus has a rotor constituted in a cryostat structure and comprising a cold rotor and a superconducting winding to be cooled by coolant, a heat shielding member for heat-shelding the cold rotor, a magnetic coupling device for coupling the cold rotor to a rotational shaft in a non-contact means by a magnetic force, a field current source for supplying field current to the superconducting winding, a stator disposed in space at a predetermined interval from the cold rotor and having an armature winding, and a refrigerator provided in the rotor to cool coolant introduced into the superconducting rotor and warmed up by cooling the superconducting winding.

15 Claims, 7 Drawing Sheets

SUPERCONDUCTING ROTATING APPARATUS

BACKGROUND OF THE INVENTION

1. Field of the Invention

The present invention relates to a superconducting rotating apparatus such as a superconducting generator in which at least a winding mounted on a rotor are composed of a superconductor.

2. Description of the Related Art

In a conventional generator, a field winding composed of a superconductor is contained in a rotor, and both end portions of a shaft of the rotor are rotatably supported by bearings. A stator has an armature winding spaced at a predetermined interval from the rotor, and mounted in a stator frame. The stator frame is connected to the bearings and supported to a base. A coupling for connecting a driving device to one shaft end portion of the rotor is provided on one side of the rotor, and a field current source for supplying a field current to a field winding and a coolant supply source for supplying coolant into the rotor are provided on the other shaft end portion of the rotor.

The rotor of the superconducting generator has complicated mechanism and parts for holding the superconductors at a superconducting temperature. For example, a cold rotor for containing the field winding is heat-shielded from the exterior to hold the superconductors at a superconducting temperature, and constructed in a structure to be cooled with coolant. More specifically, a heat shielding cylinder having a mirror-surface state on the surface and a magnetic shielding cylinder for shielding the field winding against a detrimental magnetism from the armature are arranged concentrically on the outer periphery of the cold rotor, and rooms formed among the cold rotor, the heat shielding cylinder and the magnetic shielding cylinder are respectively formed in vacuum rooms held in vacuum. Therefore, conduction of heat to be introduced from the outer periphery into the cold rotor is prevented by the vacuum rooms, and radiant heat is radiation-shielded by the mirror-surface of the heat shielding cylinder. A torque tube of a thin hollow cylindrical structure and a radiation shield formed on the surface in a mirror-surface state for blocking the opening end of the torque tube are provided at the shaft ends of the cold rotor, and a room formed between the shaft end portion side of the rotor and the radiation shield and rooms formed in the torque tube are formed in vacuum rooms held in vacuum. Therefore, heat transfer of the heat to be introduced axially to the rotor is prevented by the vacuum rooms, and radiant heat is shielded by the mirror-surface of the radiation shield. Further, structural members around the cold rotor can be forcibly cooled by coolant, thereby strengthening to cool the cold rotor.

On the other hand, coolant supplied into and discharged out of the rotor is guided from a central hole formed at the shaft end portion of the rotor at the opposite side to the coupling into the rotor through a supply tube. In this case, since a radially outward force is applied to the coolant by a rotating centrifugal force, the coolant introduced into the cold rotor passes through a passage in the cold rotor to cool the field winding. Since the coolant raised at the temperature is reduced in the specific weight, the coolant supplied from the supply tube is gathered at the radially outside in the low temperature room in the rotor and the coolant which has cooled the room and been raised at the temperature is gathered at the central portion. Part of the coolant raised at the temperature evaporates at the control portion. The evaporated coolant gathered at the central portion can be discharged from the drain hole through a drain tube.

In the above-described superconducting generator, an exhaust tube for evacuating the vacuum rooms around the supply tube and the drain tube in the cold rotor in vacuum state is provided to heat shield among the supply coolant and the drain coolant and the rotor. In this conventional example, the vacuum rooms communicate with a vacuum pumping hole provided at the shaft end portion at the opposite side to the coupling in order to vacuum from a corresponding fixed section.

With respect to the rotor shaft end portion of the coolant supply/drain structure and the corresponding fixed section, a coolant supply device of the fixed section is partitioned therein by a plurality of flange members arranged axially at a plurality of positions spaced from the outer periphery of the rotor, and a sealing mechanism is provided in a gap between the flange members and a rotor shaft. Thus, the central hole, the drain hole and the vacuum pumping hole of the rotor shaft can communicate independently with the opposed rooms in the coolant supply device as the fixed sections. In the coolant supply device, a transfer tube communicating with a coolant supply/recovery device and a vacuum pumping tube communicating with a vacuum pumping device can be mounted in the coolant supply device, and can communicate independently with the central hole, the drain hole and the vacuum pumping hole of the rotor.

A magnet and a pair of pole pieces made of a magnetic material are disposed on the inner periphery of the flange portion, and magnetic sections having flange-shaped stages are disposed on the outer periphery of the opposed rotor shaft end portion. Magnetic fluid is poured between the stage and the pole pieces disposed as described above to be completely filled between the stage and the pole pieces to form a sealed wall without disturbing the rotation of the rotor and without contaminating the peripheral atmosphere.

However, in the above-described superconducting generator, there are problems as will be described below.

(1) Since the cold rotor is mechanically connected with the structual members of the outer rotor, external heat is conductively introduced to the cold rotor.

(2) External heat is conductively introduced to the cold rotor through current leads for supplying the field current to the field winding.

(3) Since the portion of the current leads is generally made of a normal conducting conductor, the cold rotor is heated by Joule heat generated by the field current.

(4) It is necessary to always supply coolant during operation to suppress the temperature rise of the cold rotor and to hold the superconductor which composes the field winding at the superconducting temperature, and the necessary capacity of the coolant supply device must be large.

(5) Coolant flowing loss is generated when the coolant is supplied to the low temperature room of the cold rotor through the supply tube, and the supply tube itself is a heat transfer passage to introduce external head to the rotor.

(6) Since one shaft end portion of the rotor is occupied to supply the coolant as described above, it is difficult to mount other structural parts on this shaft end portion. Since it becomes difficult to hold sealing performance as the above-described sealing mechanism is larger in diameter and thus, higher at circumferential speed, it is difficult to connect directly a shaft for operating a high torque.

SUMMARY OF THE INVENTION

Accordingly, it is a primary object of the present invention to provide a superconducting rotating apparatus capable of decreasing the heat which is introduced to the cold rotor, thus capable of supressing the temperature rise of the coolant in a room for containing a member to be cooled.

Another object of the present invention is to provide a superconducting rotating apparatus capable of preventing the introduction of heat from the shaft end portion on the opposite side to coupling with driving device by dispensing the coolant supply at the above-described portion.

Still another object of the present invention is to provide electrical superconducting rotating apparatus which can supply electrical current to a rotor and support the rotor by non-connection and non-contact so as to prevent introduction of heat into the rotor.

According to one aspect of the present invention, there is provided a superconducting rotating apparatus comprising a superconducting rotor containing superconducting winding a stator arranged in space at a predetermined interval on the superconducting rotor and having winding mounted in a stator frame, a chamber of cryostat structure for containing the superconducting rotor, and a refrigerator mounted on the rotor for coolant for cooling the superconducting winding.

According to another aspect of the present invention, there is provided a superconducting rotating apparatus wherein a photoelectric converter and a photocoupler are provided in a superconducting rotor, and a portion of current leads in the rotor is formed of an optical cable.

According to still another aspect of the present invention, there is provided a superconducting rotating apparatus wherein a photoelectric converter is provided in a cryostat, and at least portion of current leads between the converter and the rotor is formed of a superconducting conductor.

According to still another aspect of the present invention, there is provided a superconducting rotating apparatus wherein a vacuum chamber is provided between a superconducting rotor and a stator, and at least portion of the outer periphery of the rotor is held in vacuum.

According to still another aspect of the invention, there is provided a superconducting rotating apparatus wherein a refrigerator, a coolant supply tube for supplying coolant from the refrigerator to the winding in a rotor and a coolant recovering tube for recovering the coolant to the refrigerator are provided in a cryostat.

According to the superconducting rotating apparatus arranged as described above, at least a portion between cryostat composing members in a superconducting rotor is connected by a magnetic supporting device, thereby eliminating a mechanical connection between the members. Therefore, since external heat is not introduced into a cold rotor by heat conduction, the quantity of heat to be introduced into the cold rotor is reduced, thereby reducing the warm-up of the coolant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1A:
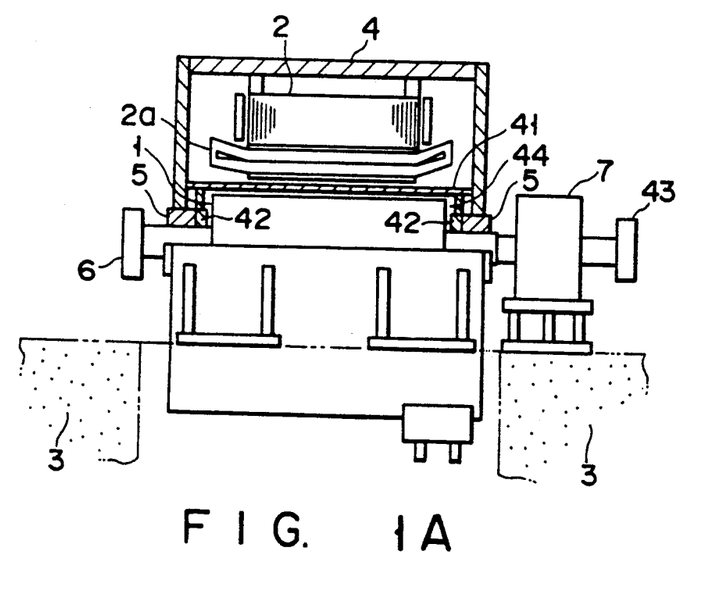
FIG. 1A is a sectional view of a superconducting rotating apparatus according to an embodiment of the present invention.
Figure 2:
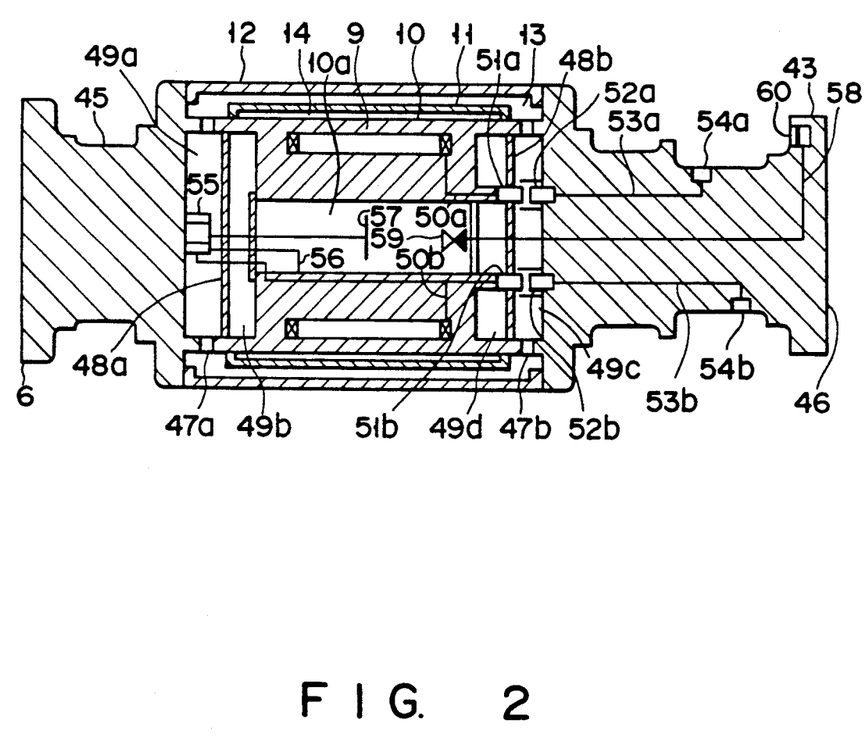
FIG. 2 is a longitudinal sectional view of a rotor in the embodiment of FIG. 1.

FIG. 1A shows an embodiment of an entire superconducting rotating apparatus according to the present invention, and FIG. 2 shows the internal structure of a superconducting rotor for use in the superconducting apparatus.

As shown in FIG. 1A, a field winding composed of a superconducting conductor is contained in a rotor 1, and both end portions of a shaft of the rotor 1 are rotatably supported by bearings 5. A stator 2 has an armature winding 2a arranged in space at a predetermined interval from the rotor 1. The stator 2 is mounted in a stator frame 4 connected to the bearings 5 and supported to a base 3. A coupling 6 for connecting a driving device to one end portion of the shaft of the rotor 1 is provided on one side thereof, and a field current source 7 for supplying a field current to the field winding is provided on the other end portion of the shaft opposite to the coupling 6.

A cylindrical chamber 41 is provided so as to surround the rotor 1 between the rotor 1 and the stator 2. Chamber mounting portions extending axially of the rotational shaft from both end portions of the chamber 41 are connected to shaft sealing mechanism 42 provided in the vicinity of the bearings 5 to form a room 44 held in a reduced pressure or in vacuum between the chamber 41 and the rotor 1. In this case, the shaft sealing mechanism 42 is held at a differential pressure between the inside of the room 44 in which the rotor 1 is disposed and the outside of the chamber 41.

Figure 1B:
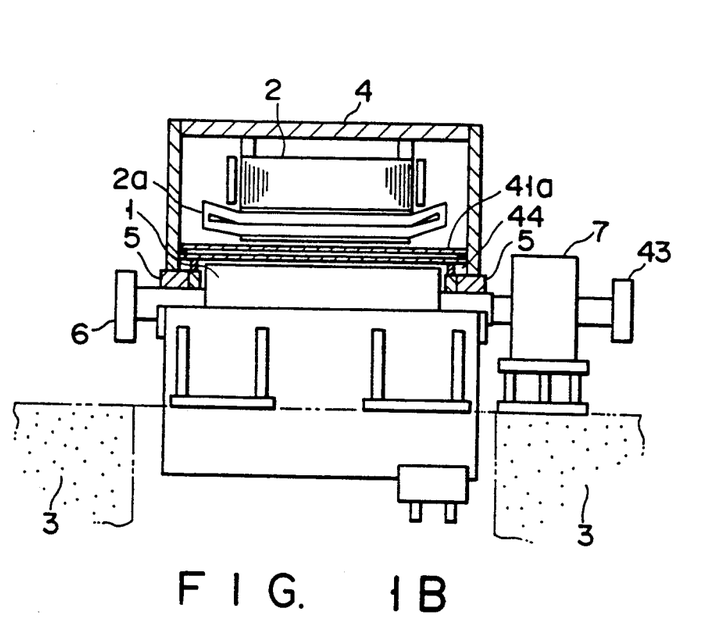
Fig. 1B is a sectional view of a superconducting rotating apparatus according to another embodiment.

When the chamber 41 is formed to be of a heat shielding structure, radiant heat to be introduced from the exterior into the chamber 41 can be further reduced. As a specific example of a heat shielding structure of the chamber 41, there is a structure wherein a chamber 41a is formed to be of a multilayer structure of two or more layers and spaces between the multilayers are vacuum pumped or cooled as shown in Fig. 1B. Each of the multilayers is mirror-like finished in order to prevent radiation heat from being introduced into the chamber 41a.

In this embodiment, a small-sized refrigerator to be described in detail later is provided in the rotor 1, thereby omitting a device for supplying coolant to the rotor during operation. Therefore, other structural parts can be mounted at both shaft end portions of the rotor. In this embodiment, a coupling 43 for directly connecting other rotational shaft is provided.

The rotor 1 is constructed as shown in FIG. 2, connection shafts 45 and 46 provided on both axial sides of the rotor 1 are connected to cold rotor 10 through magnetic couplings 47a and 47b. A heat shielding cylinder 11 having a mirror-like surface and a magnetic shielding cylinder 12 for shielding the field winding 2a against a detrimental magnetism from the armature are coaxially arranged on the outer periphery of the cold rotor 10, and mirror-like polished axial heat shielding members 48a and 48b are further provided on both axial end sides. Rooms 13a, 14, 49a, 49b, 49c and 49d formed by these structural members are held in vacuum.

As a mechanism for supplying a current to a field winding 9 contained in the cold rotor 10, terminals of the field winding 9 are connected to photoelectric converters 51a and 51b mounted on the axial heat shielding members 48b on one end side of the cold rotor 10 through current leads 50a and 50b, and photocouplers 52a and 52b are mounted at the positions of the connection shaft 46. The photocouplers 52a and 52b are respectively connected to photocouplers 54a and 54b mounted on the outer peripheral portion of the shaft through optical cables 53a and 53b. Thus, the field current is supplied to the field winding 9 by an optical transmission. In this case, the field current is supplied from the stationary side to the rotary side by optical transmitting and receiving device (not shown). The current leads 50a and 50b are formed of superconductors, and cooled to a superconducting temperature in the cold rotor 10.

According to the above-described current supply structure, heat transfers from the current leads 50a and 50b to the optical cables 53a and 53b are prevented by the vacuum room 49c and the photocouplers 52a, 52b, and 54a, 54b.

Further, according to the present invention, there is provided a coolant circulating system in which a small-sized refrigerator 55 is mounted on the shaft 45 in the room 49a of the cold temperature rotor 10, coolant fed to the cold rotor 10 for cooling the interior of the cold rotor 10 and warmed up therein is fed to the refrigerator 55 through a return tube 56, the coolant cooled down by the refrigerator 55 is again supplied to the cold rotor through a supply tube 57 to cool predetermined sections through passages (not shown), and introduced to the refrigerator 55 through the return tube 56. In this coolant circulating system, a coolant supply tube 58 is detachably connected to a coolant supply source (not shown) through a charge port 60 for filling coolant in the cold rotor 10 at an initial stage before operating the superconducting rotating apparatus. The coolant supply tube 58 is guided to the low temperature room 10a in the cold rotor 10 through the connection shaft 46, and a non-return valve 59 is provided so that the coolant does not return from the low temperature room 10a through the coolant supply tube 58. In this case, the portion of the coolant supply tube 58 near the cold rotor 10 is formed of a heat insulation material, thereby preventing external heat from being introduced into the cold rotor 10 through the coolant supply tube 58. The heat generated from the refrigerator 55 is discharged through the shaft 45.

Structural examples of the above-described magnetic couplings 47a and 47b will be described.

Figure 3A:
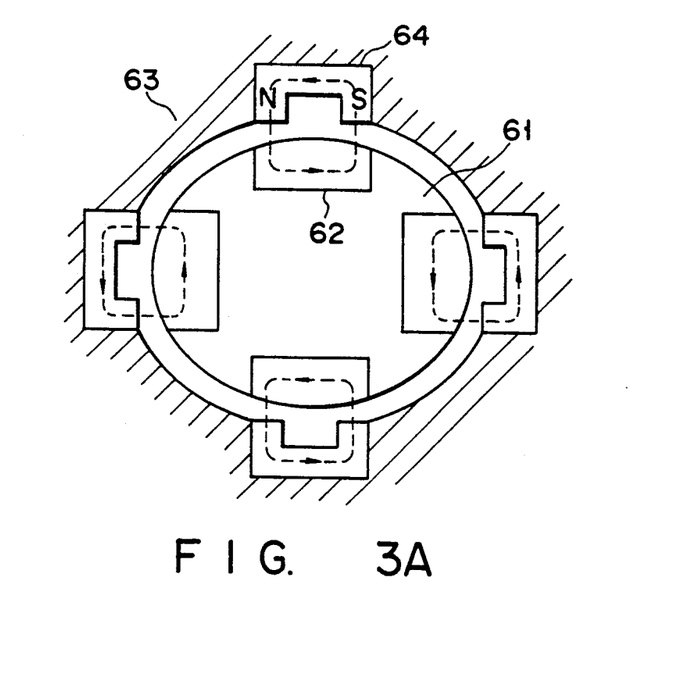
FIGS. 3A and 3B are views for explaining a principle of a magnetic coupling.

FIG. 3A shows a fundamental principle of a magnetic coupling. In FIG. 3A, to-be-supported members 61 (i.e., the connection shafts 45 and 46) partially have at least magnetic materials 62, and a supporting member 63 (i.e., the cold rotor 10) has magnets 64 at positions corresponding to the magnetic materials 62.

When the magnetic materials 62 and the magnets 64 are respectively disposed at predetermined positions of the to-be-supported members 61 and the supporting member 63, the to-be-supported members 61 are strongly attracted to the magnet 64 having a strong magnetic force. Therefore, the to-be-supported members 61 can be fixed to arbitrary positions by varying the magnetic forces of the plurality of magnets 64 fixed to predetermined positions of the supporting member 63.

Figure 3B:
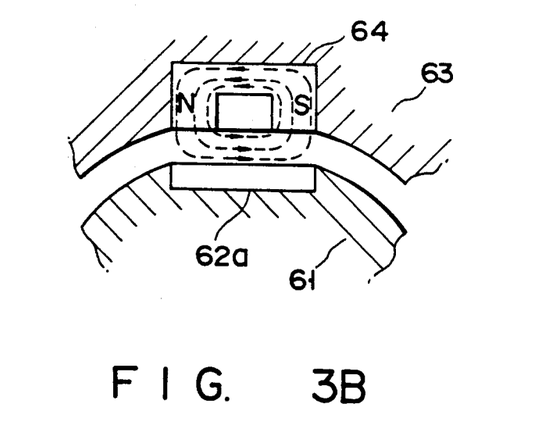
Figure 4:
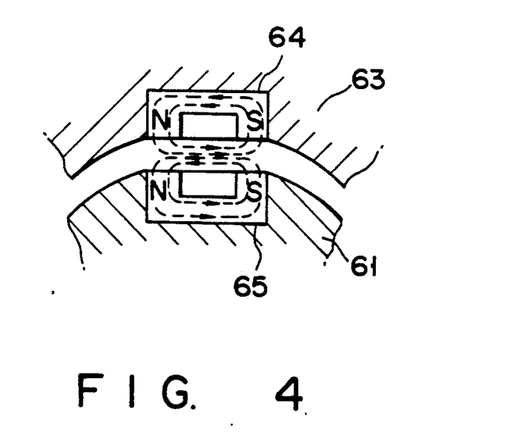
FIG. 4 is a view showing a magnetic coupling according to an example.

The above-described magnetic coupling uses the attraction force of the magnet, but can use the repelling force of the magnet as well. In this case, as shown in FIG. 3B, a diamagnetic material 62a is provided at the same position in stead of the magnetic materials of the to-be-supported member 51. As the diamagnetic material, for example, a superconductive material is used, and this diamagnetism is well known as "a Meissner effect". As the other example, as shown in FIG. 4, magnets 64 and 65 of the same polarity are oppositely disposed at both of the supporting member 63 and to-be-supported member 61.

In all the arrangements, the operating principle for fixing the to-be-supported member 61 to the arbitrary position is fundamentally the same as that in FIG. 3A though the directions of the magnetic forces are opposite. However, since the repelling force is stronger as a distance between the supporting member 63 and the to-be-supported member 61 is shorter in the method of using the repelling force of these magnets, it is advantageous to control the fixing of the position.

Since the supporting member and the to-be-supported member can be fixed at the relative positions without contact with each other in all the arrangements described above, they are effective as the magnetic coupling of the present invention. In this embodiment, the arrangement shown in FIG. 3A is representatively employed as the magnetic coupling of the present invention, and will be described.

Figure 5:
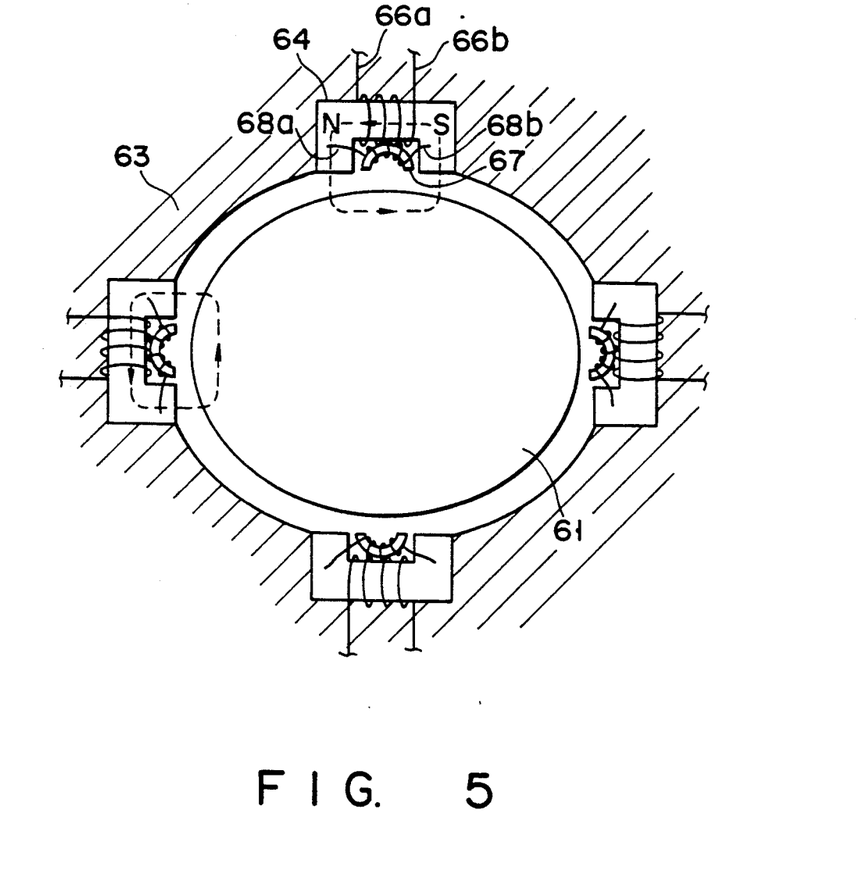
FIG. 5 is a view showing a magnetic coupling according to another example.

FIG. 5 shows an example of the case where the position of the to-be-supported member 61 is fixed.

A magnet 64 is an electromagnet. A current is supplied from current leads 66a and 66b to generate a magnetic force. The position of to-be-supported member 61 is detected by a position sensor 67, and the detection signal from the position sensor 67 is output from measuring leads 68a and 68b.

An example of a position fixing controller will be described with reference to a circuit diagram shown in FIG. 6.

Figure 6:
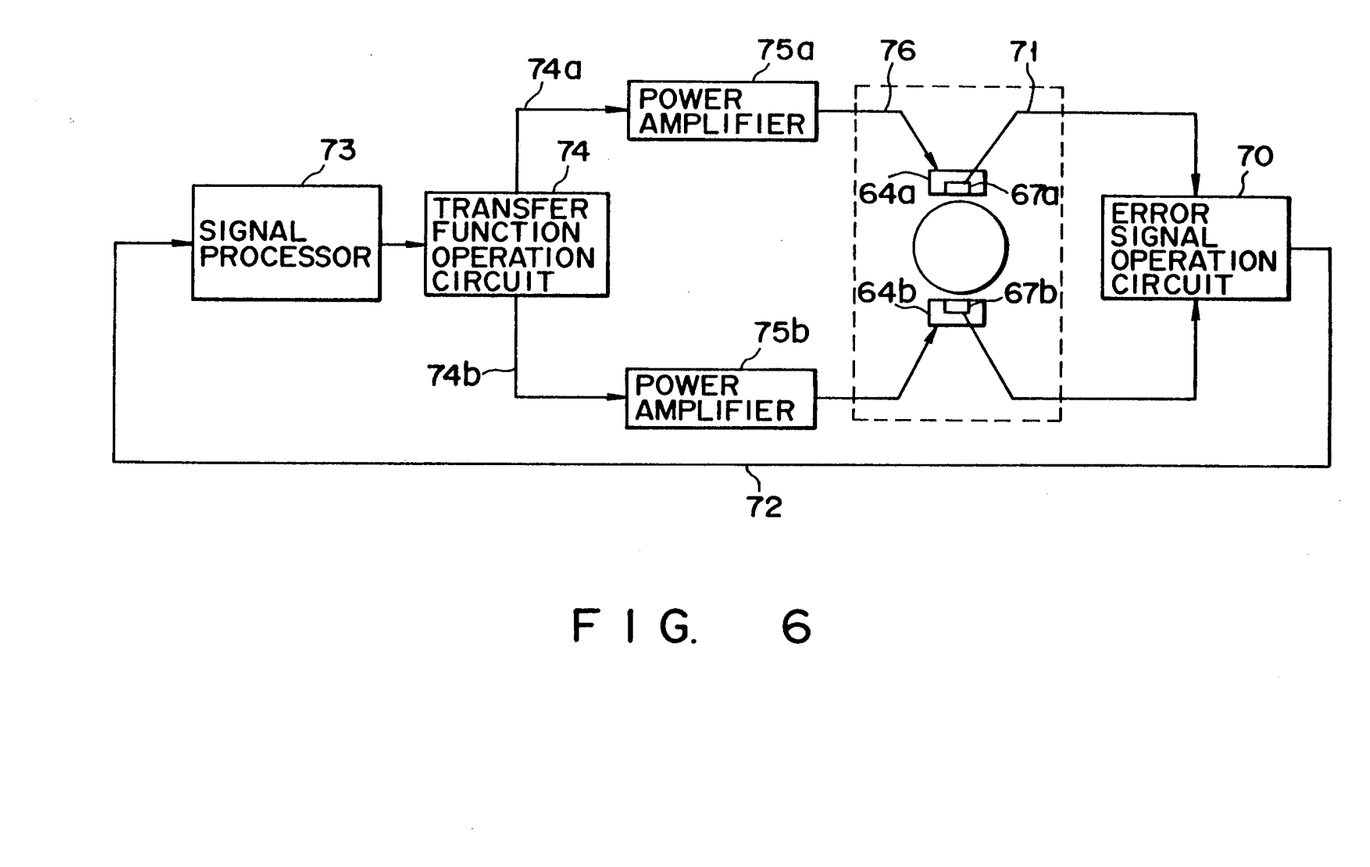
FIG. 6 is a block diagram of a magnetic coupling device using the magnetic coupling of FIG. 5.

In FIG. 6, detection signals 71 of predetermined position sensors 67a and 67b are provided to an error signal operation circuit 70 and are data processed to error signals 72, which are input to a signal processor 73. The error signals 72 are compared with a reference signal in the signal processor 73. An output signal, i.e., a comparison result signal from the signal processor 73 is processed by a transfer function operation circuit 74, and input as output signals 74a and 74b to power amplifiers 75a and 75b. Excitation signals are amplified by power amplifiers 75a and 75b according to the output signals 74a and 74b, and supplied as excitation currents 76 to electromagnets 64a and 64b. Thus, the position of the to-be-supported member 61 is controlled.

Figure 7:
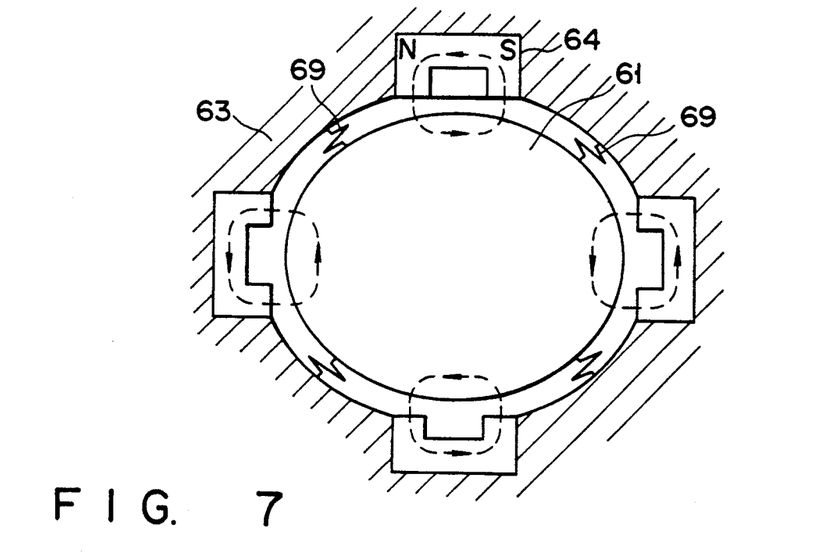
FIG. 7 is a view showing a magnetic coupling according to still another example.

FIG. 7 shows a position fixing device for to-be-supported member 61 according to another example. This position fixing device has a plurality of spacers 69 inserted at a plurality of positions between the to-be-supported member 61 and a supporting member 63 and having a predetermined rigidity to mechanically restricting the positions of both the members 61 and 63. In this arrangement, since there exists a mechanical contacting portion, a heat transfer path is formed between the to-be-supported member 61 and the supporting member 63. Since the function of the mechanical coupling comprising the spacers 69 is only supplement to the magnetic coupling, the fixing member comprising the spacers 69 can be constructed to increase the heat transfer resistance and to decrease the heat transfer amount. This position fixing device is advantageous for use with the magnetic coupling particularly using the repelling force of the magnets by the reason described above.

The above-described operating principle will be described by the example in which the present invention is applied to the magnetic couplings 47a and 47b of the embodiment of the present invention.

In FIG. 2, It is necessary to connect the cold rotor 10 to the connection shafts 45 and 46 of both end sides of the cold rotor 10 to each other with strength sufficient against the forces of three directions of the axial force, the perpendicular force and the rotational force. Therefore, the magnetic couplings 47a and 47b are disposed effectively against the forces of the three directions.

Figure 8:
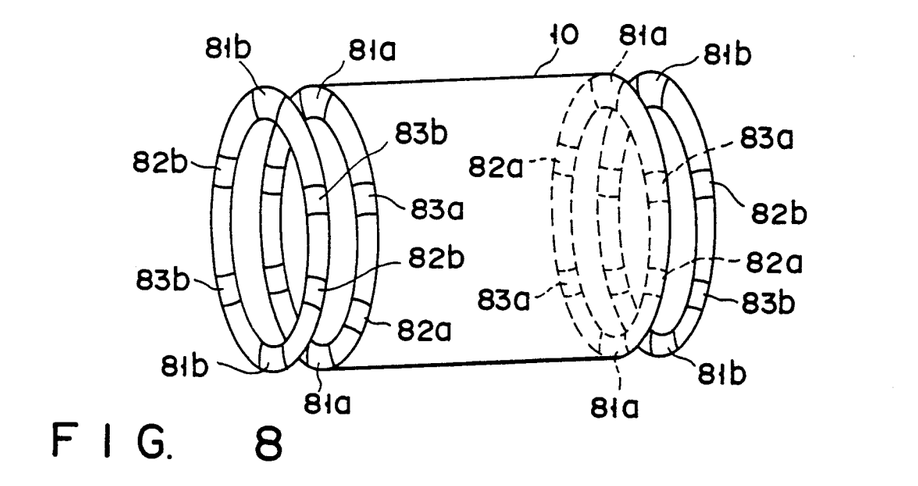
FIG. 8 is a view showing the disposition of the magnetic coupling.
Figure 9:
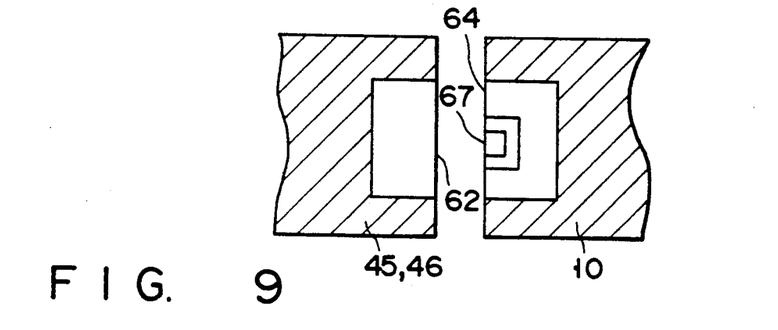
FIG. 9 is a sectional view of an axial coupling.
Figure 10:
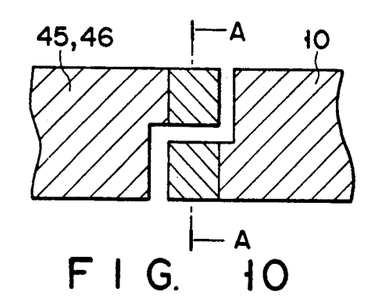
FIG. 10 is a sectional view of a coupling perpendicular to an axis.
Figure 11:
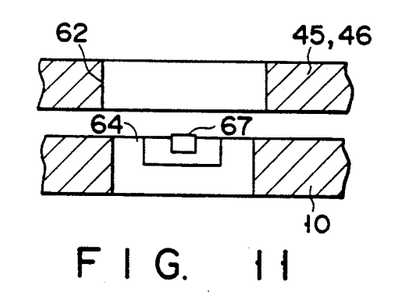
FIG. 11 is a sectional view of another coupling perpendicular to the axis.
Figure 12:
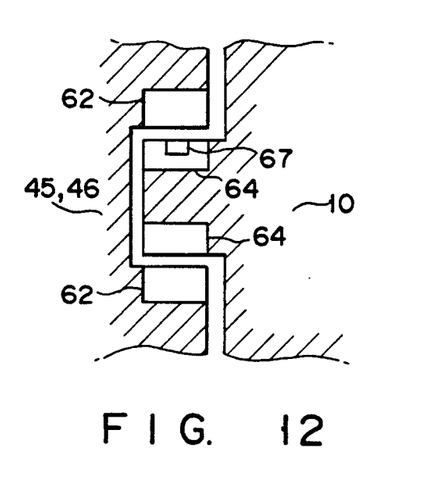
FIG. 12 is a partial sectional view of a magnetic coupling for fixing positions of axial direction, a direction perpendicular to the axis and a rotating direction.

In an example of FIG. 8, axial magnetic couplings 81a and 81b, perpendicular magnetic couplings 82a and 82b, and rotational magnetic couplings 83a and 83b are respectively provided at both axial ends of the low temperature rotor 10 and the ends of the connection shafts 45 and 46 opposed to both ends of the low temperature rotor 10. Since the constituents of the axial magnetic couplings 81a and 81b have already been described, the same reference symbols are denoted at the corresponding members, and the description thereof will be omitted. As the perpendicular magnetic couplings 82a and 82b, magnetic couplings of examples shown in FIG. 10 and FIG. 11 (in a sectional view taken along the line A—A of FIG. 10) are employed, and as the rotational magnetic couplings 83a and 83b, magnetic couplings of examples shown in FIG. 12 are employed, all of which have been already described, hence the same symbols are denoted at the corresponding members, and the description thereof will be omitted.

In the embodiment described above, the electromagnets are mounted at the cold rotor 10 side, and the windings for forming the electromagnets are made of superconducting conductors. In order to cool the superconducting conductors to a superconducting temperature part of, the coolant of the cold rotor is supplied to the superconducting winding through a coolant supply path (not shown). On the other hand, when the Meissner effect of the above-describes superconducting material is used, magnets are mounted at the connection shafts 45 and 46, and superconducting materials are mounted at the cold rotor 10, thereby similarly holding the superconducting material at the superconducting temperature.

According to the embodiment of the arrangements as described above, the cold rotor 10 is connected to the connection shafts 45 and 46 of both axial ends of the cold rotor 10 by the magnetic couplings 47a and 47b through predetermined vacuum gap. Therefore, heat conduction to the cold rotor 10 is prevented by the connecting portion to suppress the warm-up of the cold rotor 10. Since the current leads 50a and 50b in the cold rotor 10 are formed of the superconducting conductors, generation of Joule heat can be prevented, and the temperature rise of the cold rotor 10 can be suppressed. Further, since the current is supplied to the current leads 50a and 50b by means of light through the heat conduction from photocouplers 52a, 52b and 54a, 54b, introduction of external portion can be prevented, and the warm-up of the cold rotor 10 can be suppressed.

Simultaneously, most portion of the rotor rotates in vacuum to eliminate the warm-up of the surface of the rotor due to windage loss and to further suppress the warm-up of the cold rotor. Therefore, since necessary coolant amount to be supplied to the rotor during the operation is reduced, the capacity and size of the coolant supply device can be reduced to perform an economic operation. Further, the refrigerator 55 is provided in the rotor to eliminate the coolant supply device for supplying the coolant to the rotor during the operation. Thus, an application in which the rotor is driven at both shaft ends can be applicable, too.

Figure 13:
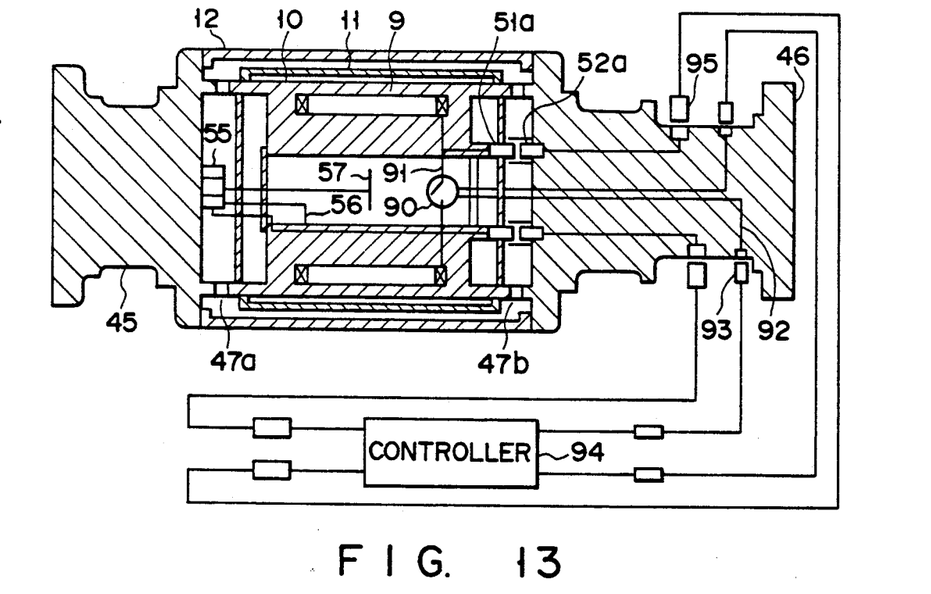
FIG. 13 is a sectional view of a rotor of a superconducting rotating apparatus according to still another embodiment of the present invention.

FIG. 13 shows still another embodiment of the present invention, wherein the same members as those in FIG. 2 are denoted by the same reference numerals, the description thereof will be omitted, and only different points will be described. In this embodiment, as shown in FIG. 13, field windings 9 of both poles are connected by superconducting conductors 91 through a permanent current switch 90 which is operated by an optical signal. An optical cable 92 is arranged between the permanent current switch 90 and the outer periphery of one connection shaft 46, and a drive signal from a controller 94 provided externally is applied as an optical signal to the permanent current switch 90 through the optical cable 92 and a photocoupler 93. In this case, the optical signal for the switch is supplied to the permanent current switch 90 in cooperation with the optical signal for controlling the current of the field winding 9 through a photocoupler 95 by an external controller 94.

In the case where the superconducting generator of the arrangement described above is operated with the constant exciting current, the permanent current switch 90 is operated when a predetermined current value is supplied to the field winding 9 to cut off the supply current, thereby performing an economical operation without necessity of external current supply.

The above-mentioned embodiments have been described with respect to the representative superconducting generator. However, the present invention can be also applied to the entire superconducting rotating machines, and the individual constituent members may be variably combined.

According to the present invention, there is provided the superconducting rotating apparatus in which the heat transfer amount introduced into the cold rotor can be reduced to reduce the warm-up of the coolant and the supply of the coolant from the shaft end portion of the rotor is eliminated to prevent the heat transfer from the portions.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A superconducting rotating apparatus comprising:
   a superconducting rotor having a cryostat structure and containing a superconducting winding cooled by a coolant;
   field current source means for supplying a field current to said superconducting winding; and
   a stator disposed at a predetermined interval from said superconducting rotor and having an armature winding;
   refrigerating means contained within said superconducting rotor, for cooling the coolant introduced therein which coolant was heated when passed through said superconducting winding; and
   photocoupler means for transmitting a field current from said field current source means to said superconducting winding by means of photoelectric conversion.

2. A superconducting rotating apparatus according to claim 1, wherein said superconducting rotor comprises shaft means having first and second shaft end portions disposed sequentially in a rotational shaft direction, a cold rotor having first and second ends disposed between said first and second shaft end portions, cooled by said coolant which coolant is cooled by said refrigerating means and containing said superconducting winding, a heat shielding vessel for sealingly containing said cold rotor, and magnetic coupling means for connecting said cold rotor to said shaft means in a non-contact state by means of magnetic force.

3. A superconducting rotating apparatus according to claim 1, which includes coolant supplying means having a charge port for receiving the coolant from a coolant supply source, a supply tube for guiding the coolant to the cold rotor, and a coolant circulating system having a supply tube for feeding warmed-up coolant to said refrigerating means and a return tube for returning the coolant cooled down by said refrigerating means to said cold rotor.

4. A superconducting rotating apparatus according to claim 2, wherein said magnetic coupling means comprises means provided at said first and second shaft end portions and the ends of said cold rotor which correspond to said first and second shaft end portions, for coupling said cold rotor to said shaft end means in non-contact state by means of a magnetic attraction force.

5. A superconducting rotating apparatus according to claim 4, wherein said magnetic coupling means comprises at least one magnet mounted at each of said first and second shaft end portions, and at least one magnetic material provided at a position corresponding to said magnet at each of the ends of said cold rotor.

6. A superconducting rotating apparatus according to claim 4, wherein said magnetic coupling means comprises at least one magnet mounted at each of said first and second shaft end portions, and at least one diamagnetic material provided at a position corresponding to said magnet at each of the ends of said cold rotor.

7. A superconducting rotating apparatus according to claim 6, wherein said magnet is an electromagnet.

8. A superconducting rotating apparatus according to claim 4, wherein said magnetic coupling means comprises at least one electromagnet mounted at each of said first and second shaft end portions, at least one magnetic material provided at a position corresponding to said electromagnet at each of the ends of said cold rotor, a position sensor for detecting a position of said cold rotor and outputting a detection signal, and means for supplying an exciting current to said electromagnet in response to the detection signal from said position sensor.

9. A superconducting rotating apparatus according to claim 2, wherein said magnetic coupling means has supplementary means which comprises a plurality of mechanical spacers provided between each of said first and second shaft end portions and each of the ends of said cold rotor.

10. A superconducting rotating apparatus according to claim 4, wherein said magnetic coupling means comprises first magnetic coupling means for axially coupling said low temperature rotor to said shaft means, second magnetic coupling means for coupling perpendicularly to an axis said cold rotor to said shaft means, and third magnetic coupling means for coupling in a rotating direction said cold rotor to said shaft means.

11. A superconducting rotating apparatus according to claim 4, wherein said magnetic coupling means comprises at least one electromagnet mounted at each of the end portions of said cold rotor and having a superconducting conductor winding to be cooled by the coolant, and at least one magnet mounted at each of said first and second shaft end portions.

12. A superconducting rotating apparatus according to claim 1, wherein said superconducting rotor comprises shaft means having first and second shaft end portions disposed sequentially in a rotational shaft direction, a cold rotor disposed between said first and second shaft end portions, cooled by said coolant and containing said superconducting winding, a heat shielding vessel for sealingly receiving said cold rotor, magnetic coupling means for connecting said cold rotor to said shaft means in a non-contact state by means of a magnetic force, and photocoupler means provided between one of said first and second shaft end portions and said cold rotor for transmitting a field current and a driving current from said field current source means to said superconducting winding and said refrigerating freezing means by means of photoelectric conversion.

13. A superconducting rotating apparatus according to claim 1, wherein said cold rotor comprises a permanent current switch to be opened when a field current to be supplied from said field source means to said superconducting winding to supply a permanent current to said superconducting winding reaches a predetermined current value.

14. A superconducting rotating apparatus according to claim 12, wherein said heat shielding vessel comprises a vessel of a multilayer structure.

15. A superconducting rotating apparatus comprising:

a superconducting rotor unit having a cryostat structure and including a cold rotor containing a superconducting winding cooled by coolant, and a heat shielding vessel for sealingly containing said cold rotor, and field current source means for supplying a field current to said superconducting winding;

a stator disposed at a predetermined interval from said superconducting rotor and having an armature winding;

refrigerating means contained within said superconducting rotor unit, for cooling coolant previously warmed up when said coolant passed through said superconducting winding;

photocoupler means for transmitting a field current from said field current source means to said superconducting winding by means of photoelectric conversion; and means for supplying said coolant to said cold rotor at an initial stage before operation of said superconducting rotating apparatus.

* * * * *